Feb. 13, 1934. W. F. LEWIS 1,946,943
STRAINER
Filed Aug. 30, 1930 2 Sheets-Sheet 1

Inventor
William F. Lewis,
By S. Clyde Jones
Attorney

Feb. 13, 1934.   W. F. LEWIS   1,946,943
STRAINER
Filed Aug. 30, 1930   2 Sheets-Sheet 2

Inventor
William F. Lewis,
By D. Clyde Jones
Attorney

Patented Feb. 13, 1934

1,946,943

UNITED STATES PATENT OFFICE 1,946,943

STRAINER

William F. Lewis, Canandaigua, N. Y., assignor to Lisk Manufacturing Company, Canandaigua, N. Y., a corporation of New York Application August 30, 1930. Serial No. 479,036

5 Claims. (Cl. 210—159)

This invention relates to improvements in strainers and more particularly to milk strainers.

It is essential that milk strainers embody a construction which will give a maximum amount of straining surface, which is easily kept sanitary, which permits easy renewal of the filter or straining unit or units, and which at the same time protects the filter or straining unit from displacement or damage by the rapid pouring of milk thereon.

The present invention has for its purpose the provision of a strainer which gives all of these highly desirable results and which at the same time is simple in construction and relatively inexpensive to manufacture.

Figure 1:
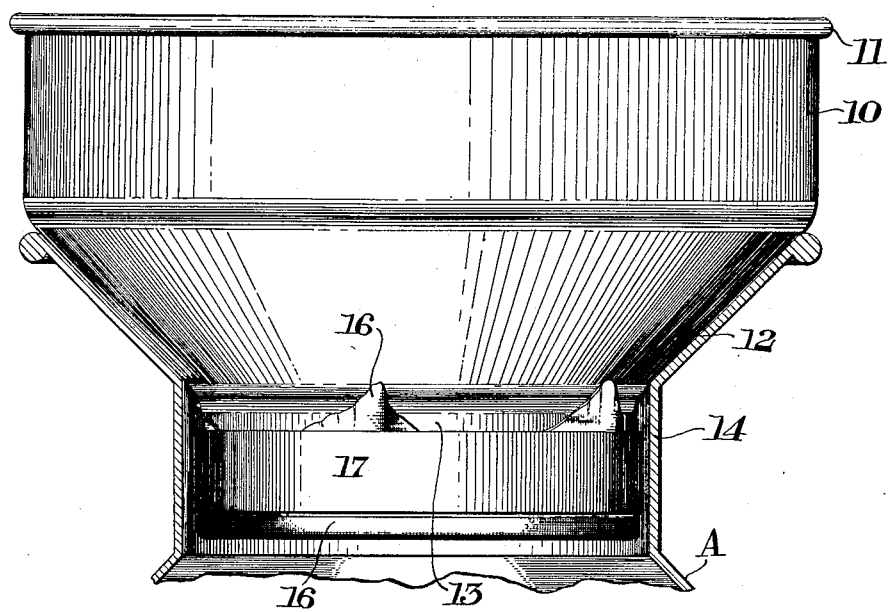
Figure 2:
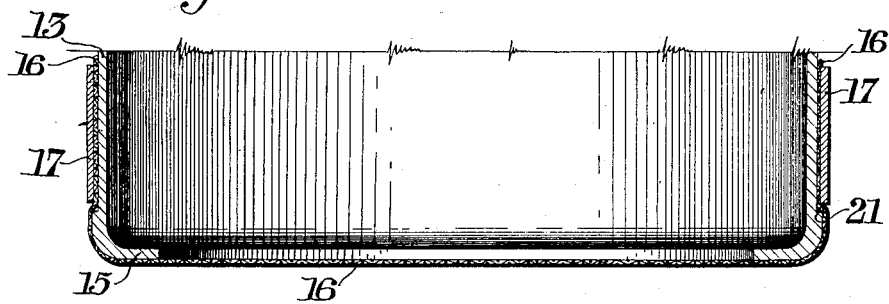
Figure 2A:
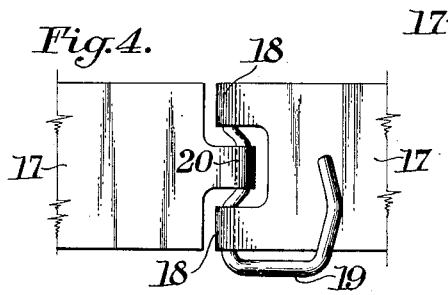
Figure 5:
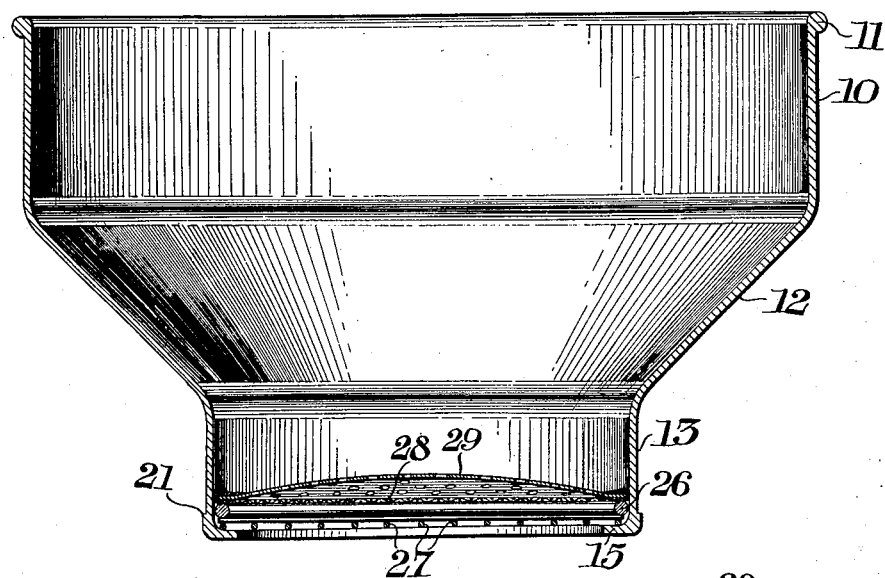
Figure 6:
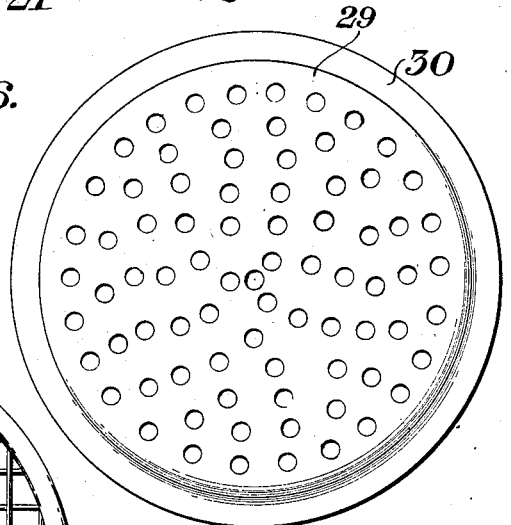

For a clearer understanding of the invention reference is made to the drawings in which Fig. 1 is a side elevation of the strainer supported in the mouth of a milk can partially represented in vertical cross-section; Fig. 2 is a vertical section of the lower part of this strainer showing one of the straining or filtering elements, the upper part of the strainer having been broken away; Fig. 2A is an enlarged detail view in cross-section of the construction of the lower edge of the strainer with its attached reinforcing shoulder member; Fig. 3 shows a side view of a portion of a clamp in open or releasing position, which clamp normally serves to retain the cloth or other straining filter on the lower end of the strainer; Fig. 4 is a side view of a portion of the same clamp in closed or retaining position; Fig. 5 is a vertical cross-section of the strainer showing the internal filter member and its related elements; Fig. 6 is a top view of the filter-protecting disk; and Fig. 7 is a top view of the filter-supporting grid.

As illustrated in Fig. 1, the strainer is made bowl-shaped having at its upper portion a cylindrical part 10 finished at its upper edge by a reinforcing bead 11. Integral with the lower edge of this cylindrical part, there is formed a tapered or funnel-shaped portion 12 merging into a second cylindrical portion or neck 13 of slightly smaller diameter than the mouth 14 of the can or container A, with which the strainer is to be used. The neck portion 13 terminates in a horizontal, circular flange 15, the inner edge of which defines the outlet or straining area of the strainer. A circular shoulder member 21, arcuate in cross-section, is soldered or otherwise attached to the lower edge of the neck portion 13 and the circular flange 15, while the edge 22 of the circular flange 15 is spun back over the edge of the shoulder member (Fig. 2A). The shoulder member thereby serves to strengthen and reinforce the lower edge of the strainer against denting and provides means whereby the filter or straining cloth 16 may be retained in place, over the bottom of the strainer by means of a clamping band 17 which firmly clamps the straining cloth 16 against the neck portion 13 of the strainer. This band 17 as shown in Figs. 3 and 4 terminates at one end in two loops 18 in which the member or rod 19 is rotatable from its open or releasing position, shown in Fig. 3, to its closed or retaining position, shown in Fig. 4. The other end of band 17 terminates in a loop 20 enclosing an offset or cam portion of the member 19.

The cloth 16 or other suitable filtering material is adjusted by placing it over the mouth of the strainer after which the clamping band 17, with the member 19 as shown in Fig. 3, is drawn over the cloth 16 and the neck 13 of the strainer. Thereafter, the member 19 is rotated to the position shown in Fig. 4 so that the cloth or filter is tightly clamped between the portion 13 and the band 17. The lower edge of the band 17 engages the shoulder 21 so that the band and the cloth or filter are firmly locked in position. The locking rod or member 19, in closed position lies snugly against the clamping band 17 so that the neck of the strainer may be inserted in the can or other container while at the same time, the neck of the strainer is almost as large as the mouth of the container thereby giving the maximum straining area. When the neck 13 of the strainer is inserted in the mouth 14 of the milk can, the space remaining between the band 17 and the mouth of the can is so small that the member 19 cannot be moved to the releasing position as shown in Fig. 3 and, therefore, it is impossible for the straining cloth to become accidentally released while the strainer is in the can.

Figure 7:
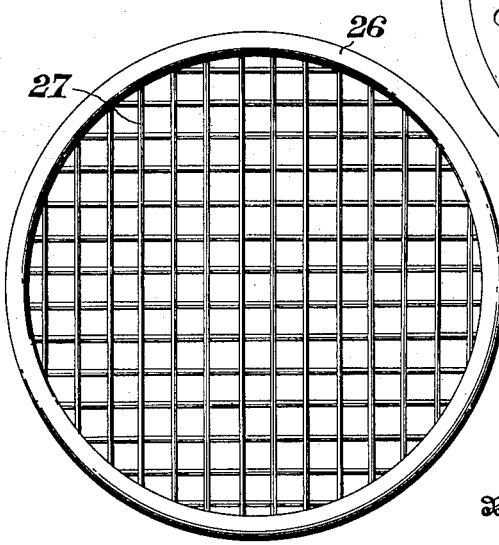

The strainer is also provided with an additional straining or filtering element, as shown in Figs. 5, 6, and 7, including a grid formed of a ring 26 to which there is attached the large mesh screen 27 adapted to be supported on the circular flange 15 surrounding the opening of the strainer. Although this grid has been represented as being made of mesh screen, it may be made from a circular, metal plate punched with openings of a size similar to those in the screen 27. On top of this grid, there is placed a layer of cotton batting 28 or other filter material. In order to retain the cotton batting in position and to protect it from being torn when the milk is poured into the bowl of the strainer, there is provided a dome-shaped perforated disk 29 having a substantially flat periphery 30 of such diameter that it tightly forces and frictionally holds the cotton batting against the inside of the neck 13, and thereby prevents leakage of milk between the edge of the disk 29 and the neck. The disk 29 is perforated and dome-shaped so that there may be a reservoir of milk between the filter 28 and the under surface of the disk 29. While the under surface of filter 28 is shown in an horizontal position in Fig. 5, to more clearly disclose the arrangement of parts, it normally rests on the wire grid 27 to prevent its being torn under the weight of the milk.

Both the straining cloth 16 and the filter 28 can be used together, although the strainer may be used as indicated in Figs. 1 and 2 without the corresponding parts shown in Figs. 5, 6, and 7 or it may be used as shown in Fig. 5 without the straining cloth 16 and the retaining clamp 17.

What I claim is:

1. A strainer comprising a receptacle having a cylindrical portion provided with an external shoulder and an inwardly extending annular flange defining an opening, a clamp adapted to grip a strainer cloth against the outside of said cylindrical portion and having its lower edge adapted to grip said cloth against said shoulder, a grid resting on said annular flange and adapted to support a filter, a perforated dome-shaped plate having its lower peripheral surface resting on said filter, the edge of said plate forcing said filter against the inner surface of said cylindrical portion to form a seal between the edge of said plate and said cylindrical portion.

2. A strainer comprising a receptacle having a cylindrical portion provided with an inwardly extending annular flange defining an opening, and a dome-shaped perforated plate positioned above said flange adapted to grip a filter between its edge and the inner wall of said cylindrical portion.

3. A strainer comprising a receptacle having a hollow cylindrical portion provided with an inwardly extending annular flange defining an opening, an open work grid resting on said flange adapted to support a filter, and a dome-shaped perforated plate having a substantially flat annular peripheral surface, the edge of said surface being adapted to force the filter against the inner wall of said cylindrical portion to form a seal between said portion and the edge of said plate.

4. In combination with a container having a mouth of a certain size, a strainer comprising a receptacle having a cylindrical portion defining a straining opening and provided with an external shoulder, a divided clamping ring adapted to hold a strainer cloth over the end of said cylindrical portion and gripping the side wall thereof, said ring being held in place by said shoulder, and a cam member adapted to lock said band in clamping position, said cam member being locked against opening by the mouth of the container when the strainer is supported therein.

5. In combination with a container having a mouth of a certain size, a strainer comprising a receptacle having a hollow cylindrical portion defining a straining opening and provided with an external shoulder, a divided clamping ring adapted to hold a strainer cloth over the end of said cylindrical portion and engaging the side wall thereof, said ring when clamped being held in place by said shoulder, and a cam member comprising a single, eccentric bent rod engaging both ends of said band to lock the same in clamping position, said cam member being prevented from opening by the mouth of the container when the strainer is supported therein.

WILLIAM F. LEWIS.